(12) United States Patent
Oki et al.

(10) Patent No.: US 7,526,868 B2
(45) Date of Patent: May 5, 2009

(54) POWER TOOL WITH VIBRATION REDUCTION

(75) Inventors: Sadaharu Oki, Anjo (JP); Shinji Hirabayashi, Anjo (JP); Kenji Kobayashi, Anjo (JP)

(73) Assignee: Makita Corporation, Anjo-Shi (JP)

( * ) Notice: Subject to any disclaimer, the term of this patent is extended or adjusted under 35 U.S.C. 154(b) by 0 days.

(21) Appl. No.: 11/289,547

(22) Filed: Nov. 30, 2005

(65) Prior Publication Data
US 2006/0117581 A1 Jun. 8, 2006

(30) Foreign Application Priority Data
Dec. 2, 2004 (JP) ............................. 2004-350015

(51) Int. Cl.
B26B 3/26 (2006.01)
(52) U.S. Cl. ............................. 30/392; 30/393; 30/517
(58) Field of Classification Search ............... 30/392, 30/393, 517
See application file for complete search history.

(56) References Cited

U.S. PATENT DOCUMENTS

| 5,212,887 | A | | 5/1993 | Farmerie |
| 5,293,959 | A | * | 3/1994 | Kimberlin ................. 184/6.14 |
| 5,392,519 | A | | 2/1995 | Inoue et al. |
| 5,722,309 | A | * | 3/1998 | Seyerle ..................... 83/699.21 |
| 5,794,352 | A | * | 8/1998 | Dassoulas .................... 30/392 |
| 6,148,930 | A | * | 11/2000 | Berger et al. ............. 173/162.2 |
| 6,321,853 | B2 | * | 11/2001 | Giardino et al. ................. 173/1 |
| 6,550,147 | B1 | * | 4/2003 | Fishlock et al. ............... 30/375 |
| 6,766,868 | B2 | * | 7/2004 | Frauhammer et al. ......... 173/48 |
| 2001/0034941 | A1 | * | 11/2001 | Bednar et al. ................. 30/392 |
| 2002/0005290 | A1 | * | 1/2002 | Giardino et al. ............. 173/212 |
| 2003/0037937 | A1 | * | 2/2003 | Frauhammer et al. ......... 173/48 |
| 2004/0016134 | A1 | * | 1/2004 | Bednar et al. ................. 30/392 |
| 2004/0117992 | A2 | * | 6/2004 | Bednar et al. ................. 30/392 |
| 2004/0148789 | A1 | * | 8/2004 | Gist et al. ..................... 30/392 |
| 2004/0187322 | A2 | * | 9/2004 | Bednar et al. ................. 30/392 |
| 2005/0000097 | A2 | * | 1/2005 | Bednar et al. ................. 30/392 |
| 2005/0039340 | A1 | * | 2/2005 | Bigden et al. ................. 30/392 |
| 2005/0087353 | A1 | * | 4/2005 | Oki et al. ................. 173/162.2 |
| 2005/0188552 | A1 | * | 9/2005 | Gist et al. ..................... 30/392 |

(Continued)

FOREIGN PATENT DOCUMENTS

DE 195 03 526 A1 8/1996

(Continued)

Primary Examiner—Kenneth E. Peterson
Assistant Examiner—Sean Michalski
(74) Attorney, Agent, or Firm—Oliff & Berridge, PLC (57) ABSTRACT

It is an object of the invention to provide a useful technique for reducing vibration of a handgrip and improving the cutting efficiency while achieving weight reduction of a reciprocating power tool. According to the invention, a representative reciprocating power tool is provided to comprise a body, a tool bit, an actuating mechanism, a handgrip. The handgrip and the body can rotate with respect to each other via a pivot in a direction crossing the direction of reciprocating linear motion of the tool bit. An elastic element is disposed between the handgrip and the body and serves to absorb vibration transmitted from the body to the handgrip by elastically receiving the relative rotation of the handgrip and the body. According to the invention, vibration in the handgrip can be reduced and the cutting efficiency can be improved without complicating the construction.

26 Claims, 5 Drawing Sheets

U.S. PATENT DOCUMENTS

2005/0263307 A1 * 12/2005 Stirm et al. .............. 173/162.2

FOREIGN PATENT DOCUMENTS

| | | |
|---|---|---|
| EP | 0 561 473 A1 | 9/1993 |
| EP | 1 510 298 A1 | 3/2005 |
| GB | 714300 | 8/1954 |
| GB | 2 297 514 A | 8/1996 |
| JP | Y2-58-35427 | 8/1983 |
| JP | A 6-79701 | 3/1994 |
| JP | A 2001-9632 | 1/2001 |
| JP | A 2005-74573 | 3/2005 |

* cited by examiner

POWER TOOL WITH VIBRATION REDUCTION

BACKGROUND OF THE INVENTION

1. Field of the Invention

The present invention relates to a reciprocating power tool such as a reciprocating saw and more particularly, to a technique for reducing vibration in cutting a workpiece and a cutting technique when the reciprocating power tool is in operation.

2. Description of the Related Art

Japanese non-examined laid-open Patent Publication No. 2001-9632 (hereinafter referred to as "D1") discloses an electric reciprocating saw as an example of a reciprocating power tool. The known reciprocating saw includes a motion converting mechanism for causing a slider to reciprocate in the longitudinal direction. A counter weight is provided in the motion converting mechanism. When the slider reciprocates, the counter weight reciprocates in a direction opposite to the reciprocating direction of the slider, with a 180° phase shift with respect to the slider. As a result vibration of the reciprocating saw caused by the reciprocating movement of the slider can be reduced.

Further, Japanese non-examined laid-open Patent Publication No. 06-79701 (hereinafter referred to as "D2") discloses an electric reciprocating saw having a first motion converting mechanism for converting the rotating output of a motor into reciprocating linear motion in the longitudinal direction of the slider and a second motion converting mechanism for converting the rotating output of the motor into swinging motion in the vertical direction of the slider. In the reciprocating saw having such a construction, the tool bit or the blade supported by the slider not only linearly reciprocates in the longitudinal direction, but swings in the vertical direction, whereby the cutting efficiency can be increased.

In the reciprocating saw as disclosed in D1, because the counter weight is additionally provided for vibration reduction in the motion converting mechanism, the weight of the reciprocating saw itself is increased by the weight of the counter weight. Therefore, further improvement is desired in this respect. On the other hand, in the reciprocating saw disclosed in D2, the actuating mechanism for the blade includes the first motion converting mechanism for causing the blade to linearly reciprocate and the second motion converting mechanism for causing the blade to swing in the vertical direction. Therefore, the actuating mechanism is complicated in structure, the weight of the entire saw is increased, and the size of the entire housing for housing these mechanisms is increased. Therefore, further improvement is also desired in this respect.

SUMMARY OF THE INVENTION

Accordingly, it is an object of the invention to provide a useful technique for reducing vibration of a handgrip and improving the cutting efficiency while achieving weight reduction of a reciprocating power tool.

The above-described problem can be solved by the features of claimed invention. According to the invention, a representative reciprocating power tool is provided to comprise a body, a tool bit disposed in the tip end region of the body, an actuating mechanism disposed within the body to cause the tool bit to linearly reciprocate, a handgrip disposed on the rear end of the body on the side opposite to the tool bit. The "reciprocating power tool" according to the invention may include various power tools such as a reciprocating saw and a jig saw, to be used to cut a workpiece of various materials such as wood and metal. The "tool bit" typically comprises a blade which is formed of a steel sheet and has teeth continuously formed on the edge of the steel sheet.

According to the invention, the handgrip and the body are coupled to each other such that the handgrip and the body can rotate with respect to each other via a pivot in a direction crossing the direction of reciprocating linear motion of the tool bit. The tool bit swings together with the body with respect to the handgrip being held by a user of the power tool, while the tool bit linearly reciprocates with respect to the body via the actuating mechanism. When the tool bit linearly reciprocates with respect to the body with the handgrip held by a user, an inertial force acts upon the body. By this inertial force, the tool bit swings on the pivot together with the body with respect to the handgrip. The angle of inclination of the reciprocating tool bit is changed by the combined motion of the tool bit that swings while reciprocating. Such change of the inclination angle of the tool bit can increase the cutting efficiency.

The swinging motion of the tool bit is realized with a simple construction in which the body is coupled to the handgrip via the pivot. Therefore, compared with the prior arts in which a combination of several functional components driven by a motor is used as a motion converting mechanism in order to cause the tool bit to swing, the construction can be simpler and lighter in weight. Thus, the weight reduction of the reciprocating power tool can be achieved. Further, the body can be made thinner. Therefore, ease of use can be enhanced in performing a cutting operation while holding the handgrip by one hand and holding the tip end region of the body by the other hand.

According to the invention, an elastic element is disposed between the handgrip and the body and serves to absorb vibration transmitted from the body to the handgrip by elastically receiving the relative rotation of the handgrip and the body. The "elastic element" comprises a rubber or a spring. The manner in which the "elastic element is disposed" suitably includes both the manner in which the elastic element is disposed apart from the pivot and the manner in which the elastic element is disposed on the axis of the pivot. The elastic element disposed between the handgrip and the body absorbs and reduces vibration caused in the body and transmitted to the handgrip, by elastic deformation of the elastic element. Such vibration reduction by using the elastic element is more effective for weight reduction of the reciprocating power tool, compared with the known art uses a counter weight.

Thus, according to the invention, vibration in the handgrip can be reduced and the cutting efficiency can be improved without complicating the construction. Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved reciprocating power tools and method for using such reciprocating power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
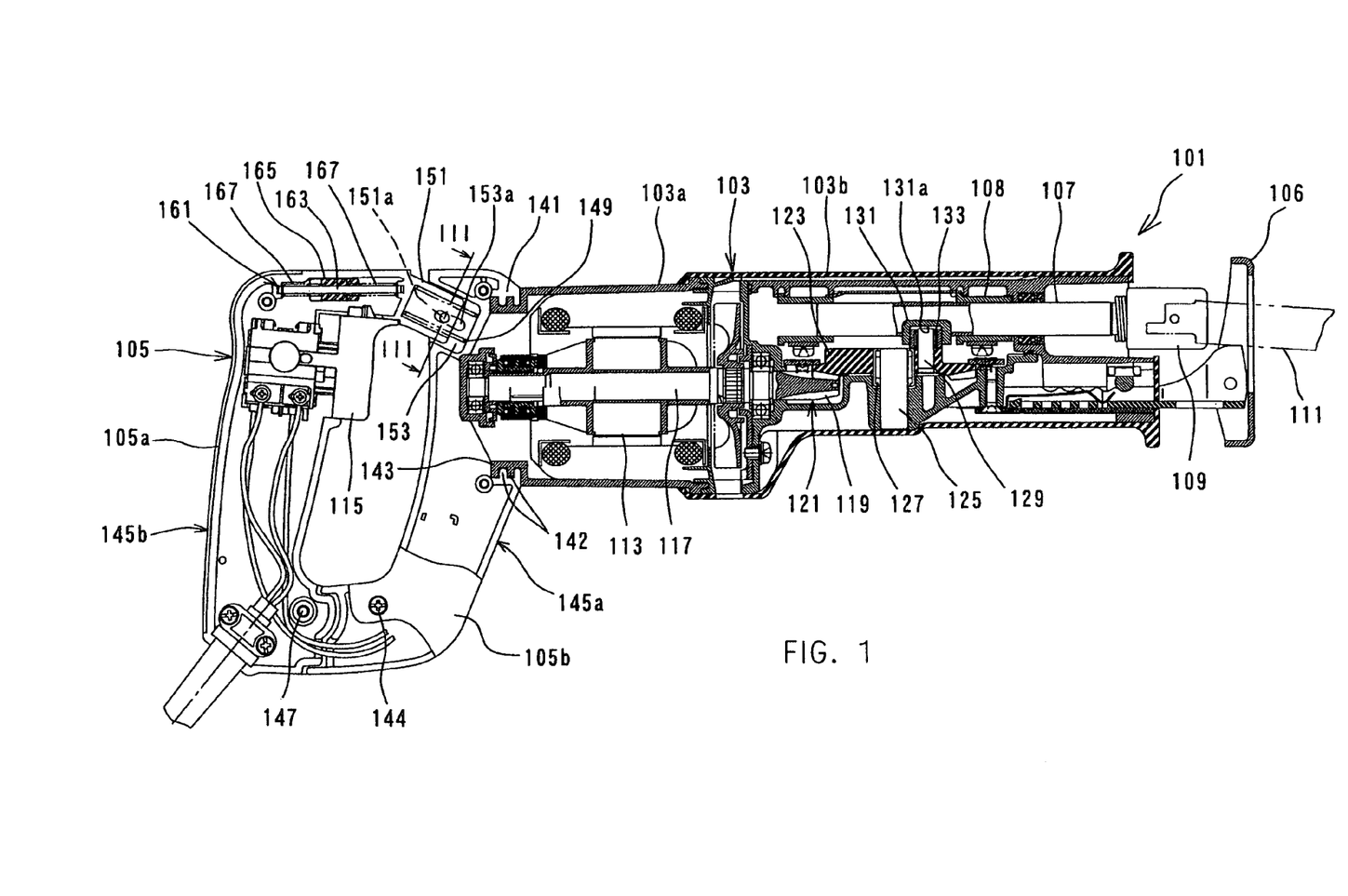
FIG. 1 is a sectional view showing an entire reciprocating saw having a vibration-proof handgrip according to an embodiment of the invention.

A representative embodiment of the present invention will now be described with reference to the drawings. As shown in FIG. 1, a reciprocating saw 101 as a representative embodiment of a reciprocating power tool according to the invention comprises a body 103, a slider 107, a blade 111 and a handgrip 105. The slider 107 projects from the body 103 and the blade 111 is detachably mounted to a chuck 109 on the end of the slider 107 and cuts a workpiece (not particularly shown). The blade 111 is a feature that corresponds to the "tool bit" according to the invention. The body 103 includes a motor housing 103a and a gear housing 103b connected to the front end of the motor housing 103a. In the present embodiment, for the sake of convenience of explanation, the side of the blade 111 is taken as the front side and the side of the handgrip 105 as the rear side in the following description.

The motor housing 103a of the body 103 houses a driving motor 113. The driving motor 113 is driven when the user depresses a trigger switch 115. The blade 111 then reciprocates in the longitudinal direction together with the slider 107 and the chuck 109 and can cut a workpiece. The slider 107 the chuck 109 and the blade 111 form a moving part. The slider 107 is supported via a bearing 108 in the gear housing 103b such that the slider 107 can reciprocate in its longitudinal direction. The slider 107 is connected to a motor shaft 117 via a motion converting mechanism 121 disposed within the gear housing 103b. The motion converting mechanism 121 is a feature that corresponds to the "actuating mechanism" according to the invention.

The motion converting mechanism 121 converts the rotational motion of the motor shaft 117 into the reciprocating motion in the longitudinal direction of the slider 107. The motion converting mechanism 121 comprises a bevel gear 123, a crank pin 129 and a slider block 131. The bevel gear 123 engages with a pinion 119 of the motor shaft 117. The bevel gear 123 is mounted to a fixed shaft 125 that is fixed to the gear housing 103b, via a bearing 127 and can rotate within a horizontal plane. The crank pin 129 is mounted on the upper surface of the bevel gear 123 at a position shifted a predetermined distance from the center of rotation of the bevel gear 123. The lower end of the crank pin 129 is fixedly mounted by press-fitting into a pin mounting hole that is formed in the bevel gear 123. The upper end of the crank pin 129 is fitted in the slider block 131 that is formed in the slider 107, via a bearing 133, Thus, the crank pin 129 can rotate with respect to the slider 107.

The slider block 131 has a guide groove 131a extending in a direction crossing the longitudinal direction of the slider 107. The crank pin 129 can move with respect to the slider block 131 along the guide groove 131a via the bearing 133 that is fitted in the guide groove 131a. With respect to the revolving motion of the crank pin 129 around the fixed shaft 125, components of the motion in the direction crossing the longitudinal direction of the slider 107 within a horizontal plane escape into the guide groove 131a and only components of the motion in the longitudinal direction of the slider 107 transmitted to the slider 107. The slider 107 is thus allowed to reciprocate only in its longitudinal direction. Further, a shoe 106 is mounted on the end of the body 103. The user presses the shoe 106 against the workpiece while holding the handgrip 105 during cutting operation.

The construction of the handgrip 105 and the construction for mounting the handgrip 105 to the body 103 will now be explained with reference to FIGS. 1 to 3. Vibration is caused in the body 103 during operation of cutting a workpiece with the reciprocating saw 101. According to the representative embodiment, in order to reduce transmission of this vibration to the handgrip 105, the handgrip 105 is constructed as follows. The handgrip 105 is a D-type handgrip which is generally D-shaped in side view. The handgrip 105 is hollow and generally rectangular in section. An opening 141 is formed in the front upper region of the handgrip 105 and opens to the front. In order to mount the handgrip 105 to the motor housing 103a, the opening 141 is fitted on the rear end of the body 103 or a grip mounting portion 143 formed in the rear end portion of the motor housing 103a.

The handgrip 105 has a two-part structure which is divided into halves along a vertical plane parallel to the axis of the slider 107. Specifically, the handgrip 105 includes right and left halves 105a, 105b (see FIGS. 2 and 3). The right and left halves 105a, 105b are butted against each other from the sides in such a manner that the region of the opening 141 covers the grip mounting portion 143. In this state, the halves 105a, 105b are joined by clamping screws 144 (see FIG. 1) at several points on tile edge portions of the halves 105a, 105b. Thus, the handgrip 105 is fixedly mounted on the grip mounting portion 143. The handgrip 105 can be detached from the grip mounting portion 143 by unscrewing the clamping screws 144 so as to disjoin the halves 105a, 105b from the grip mounting portion 143. Specifically, the handgrip 105 is constructed to be detachably mounted to the body 103. Further, as shown in FIG. 1, an engaging portion 142 is formed on the engagement surfaces between the opening 141 and the grip mounting portion 143. The respective engaging portions 142 have projections and depressions and engage with each other. By the engagement of the engaging portions 142, the handgrip 105 is prevented from falling off rearward from the body 103.

Further, the handgrip 105 is partitioned into two forward and rearward parts. The forward part comprises a fixed part 145a mounted to the motor housing 103a, and the rearward part comprises a moving grip part 145b that a user grips. The fixed part 145a is mounted to the motor housing 103a in such a manner as mentioned in the preceding paragraph. One end (lower end) of the moving grip part 145b is rotatably connected to one end (lower end) of the fixed part 145a via a pivot 147. The other end (upper end) of the moving grip part 145b is elastically connected to the other end (upper end) of the fixed part 145a via a compression coil spring 149. The compression coil spring 149 is a feature that corresponds to the "elastic element" in the present invention. With the above-mentioned construction, the moving grip part 145b and the body 103 can rotate vertically or in a direction crossing the direction of the reciprocating movement of the blade 111 about the pivot 147 with respect to each other. Thus, the vibration-proof handgrip 105 is formed with a construction in which the moving grip part 145b is rotatably connected at its lower end to the fixed part 145a via the pivot 147 and connected at its upper end to the fixed part 145a via the compression coil spring 149.

Figure 2:
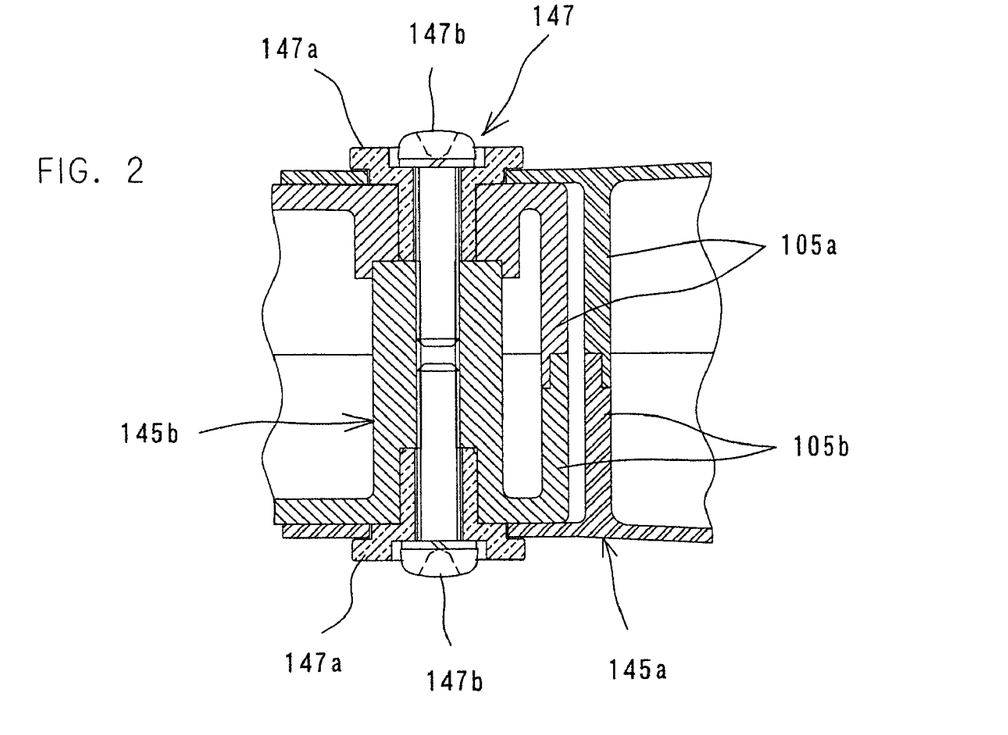
FIG. 2 is a sectional view showing a rotatable connection between a fixed part and a moving grip part.
Figure 3:
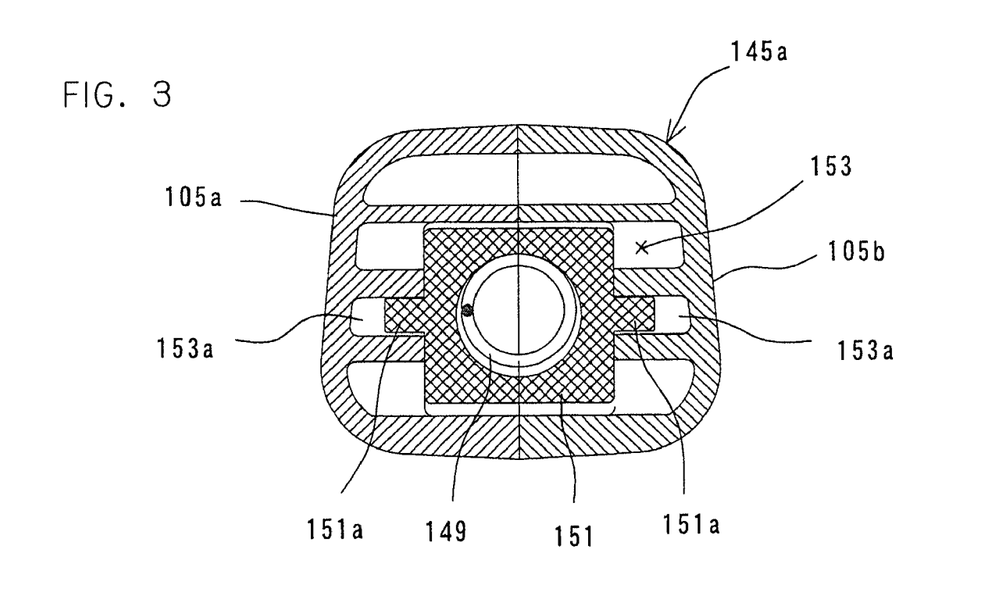
FIG. 3 is a sectional view taken along line III-III in FIG. 1.

FIG. 2 shows a rotatable connection between the fixed part 145a and the moving grip part 145b. As shown, the right and left halves 105a, 105b of the handgrip 105 are butt-joined to each other, and the side lower end portion of the fixed part 145a is fitted over the side lower end portion of the moving grip part 145b. In this state, the side end portion of the fixed part 145a is fastened to the side end portion of the moving part 145b via a bush 147a by a mounting screw 147b. In this manner, the fixed part 145a and the moving grip part 145b are rotatably connected to each other. The bush 147a and the mounting screw 147b form the pivot 147.

Further, as shown in FIG. 1, the compression coil spring 149 is disposed forward of the pivot 147 and on the axis of the slider 107 and arranged such that the biasing direction of the compression coil spring 149 is tangential to the rotation around the pivot 147. Specifically, the compression coil spring 149 is disposed on the forward decline between the fixed part 145a and the moving grip part 145b in the handgrip 105. FIG. 3 is a sectional view showing the mounting portion for mounting the compression coil spring 149. As shown in FIGS. 1 and 3, a rectangular tubular portion 151 having a circular bore is formed in the front upper portion of the moving grip part 145b and receives the compression coil spring 149. The tubular portion 151 projects forward on the decline and is movably inserted into a space 153 that is formed in the fixed part 145a. A circular projection (pin) 151a is formed on the right and left sides of the tubular portion 151 and is slidably engaged with a guide groove 153a in the space 153. (The guide groove 153a is formed in a portion of the fixed part 145a which defines and faces the space 153.) The guide groove 153a extends to a predetermined length in the inclining direction of the tubular portion 151. Thus, the fixed part 145a and the moving grip part 145b are allowed to pivot within the length range of the guide groove 153a with respect to each other. Further, one end of the compression coil spring 149 rests on the bottom of the bore of the tubular portion 151, while the other end rests on the bottom of the space 153.

A dynamic vibration reducer 161 is disposed rearward of the compression coil spring 149 within the hollow portion of the moving grip part 145b and serves to reduce vibration of the moving grip part 145b. The dynamic vibration reducer 161 is positioned so as to reduce vibration in the reciprocating direction (longitudinal direction) of the blade 111, which vibration is transmitted from the body 103 to the moving grip part 145b. The dynamic vibration reducer 161 includes a guide rod 163, a weight 165 and a biasing spring 167. The guide rod 163 extends in the longitudinal direction of the slider 107. The weight 165 is mounted on the guide rod 163 and can move in the axial direction. The biasing spring 167 is disposed on the both sides of the weight 165 in the axial direction. The biasing spring 167 applies a spring force to the weight 165 between the weight 165 and the moving grip part 145b (rod mounting portion) when the weight 165 moves in the axial direction of the guide rod 163.

Figure 6:
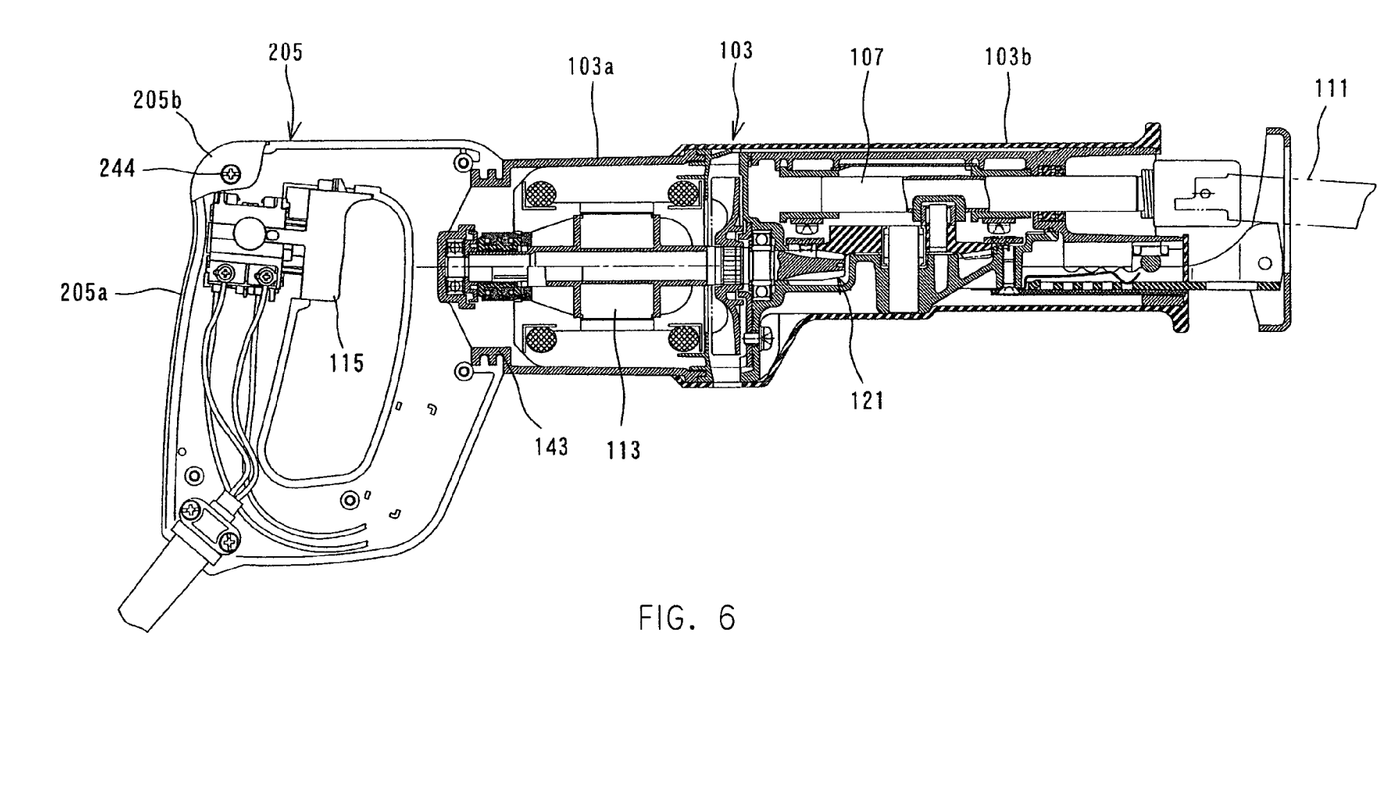
FIG. 6 is a sectional view showing an entire reciprocating saw having a normal handgrip.

Further, in the reciprocating saw 101 according to the representative embodiment, the above-mentioned vibration-proof handgrip 105 can be integrally replaced with a normal handgrip of standard specification which does not have a vibration reducing function. FIG. 6 shows the reciprocating saw 101 in which a normal handgrip 205 is attached to the body 103. The vibration-proof handgrip 105 and the normal handgrip 205 have a construction for mounting to the motor housing 103a in common such that the handgrips 105, 205 can be integrally replaced with each other. Specifically, the handgrip 205 has a two-part structure which is divided into halves along a vertical plane parallel to the axis of the slider 107 and thus includes right and left halves 205a, 205b. The right and left halves 205a, 205b are butted against each other from the sides in such a manner that the front upper portion of the handgrip 205 covers the grip mounting portion 143. In this state the halves 205a, 205b are joined by clamping screws 244 at several points on the edge portions of the halves 205a, 205b. Thus, the handgrip 205 is detachably mounted on the grip mounting portion 143.

Operation and usage of the reciprocating saw 101 constructed as described above will now be explained. When the user depresses the trigger switch 115 disposed on the moving grip part 145b of the handgrip 105 of the reciprocating saw 101 as shown in FIG. 1, the driving motor 113 is driven, and the bevel gear 123 is rotated around the fixed shaft 125 within a horizontal plane via the motor shaft 117 and the pinion 119. Then, the crank pin 129 revolves around the fixed shaft 125. As a result, the slider 107 reciprocates in the longitudinal direction between the top dead center and the bottom dead center via the slider block 137. Thus, the blade 111 that is coupled to the chuck 109 on the end of the slider 107 reciprocates and is allowed to cut the workpiece.

The user presses the shoe 106 against the workpiece to be cut and cuts the workpiece in this state from above by the reciprocating blade 111. At this time, the blade 111 can be smoothly operated even if the user obliquely presses the moving grip part 145b against the tool body 103, because the fixed part 145a and the moving grip part 145b arm rotatably connected to each other via the pivot 147.

During actuation of the blade 111 or during operation of cutting a workpiece by the blade 111, vibration is caused in the reciprocating saw 101. The handgrip 105 is segmented into the fixed pat 145a and the moving grip part 145b. The lower end of the moving grip part 145b is rotatably connected to the fixed part 145a via the pivot 147, and the upper end of the moving grip part 145b is elastically connected to the fixed part 145a via the compression coil spring 149. With such construction, vibration caused in the body 103 and transmitted to the moving grip part 145b can be absorbed and reduced by the spring force of the compression coil spring 149. The compression coil spring 149 is disposed generally on the line of reciprocating movement of the blade 111 and tangentially to the rotation around the pivot 147. Therefore, the compression coil spring 149 can efficiently absorb the longitudinal vibration which is transmitted from the body 103 to the moving grip part 145b of the handgrip 105.

Amount of vibration was measured in each of the longitudinal, vertical and lateral directions of the handgrips 105, 205 and in the three-axis resultant, using the reciprocating saw 101 with the vibration-proof handgrip 105 as shown in FIG. 1 and the reciprocating saw 101 with the normal handgrip 205 of standard specification without a vibration reducing function as shown in FIG. 6. As a result, the vibration values of the vibration-proof handgrip 105 (the moving grip part 145b) were lower than the normal handgrip 205 in all the measurements other than in the vertical direction, i.e. in the longitudinal and lateral directions and in the three-axis resultant. Thus, the vibration-proof handgrip 105 was proved to have a vision reducing effect. Further, it was also confirmed that the same vibration reducing effect can be achieved whether under unloaded or loaded conditions and whether in woodworking or in metalworking. Thus, according to the embodiment, the vibration-proof handgrip 105 was proved to have an adequate vibration reducing effect as a whole.

Further, according to this embodiment, during cutting operation, when the blade 111 linearly reciprocates together with die slider 107 and the chuck 109 in the longitudinal direction between the top dead center and the bottom dead center, the blade 111 vertically swings on the pivot 147 together with the body 103. Specifically, when the blade 111 linearly reciprocates, an inertial force acts upon the body 103 and the compression coil spring 149 receives this inertial force. The blade 111 then vertically swings on the pivot 147 while deforming the compression coil spring 149. As a result, the blade 111 performs a combined motion of the reciprocating linear motion and the vertical swinging motion on the pivot 147, or a circular arc motion in the cutting direction (longitudinal direction). Such circular arc motion of the blade 111 causes a change in the angle of inclination of the reciprocating blade 111. By virtue of the angle change of the blade 111, the cutting efficiency is enhanced.

Figure 4:
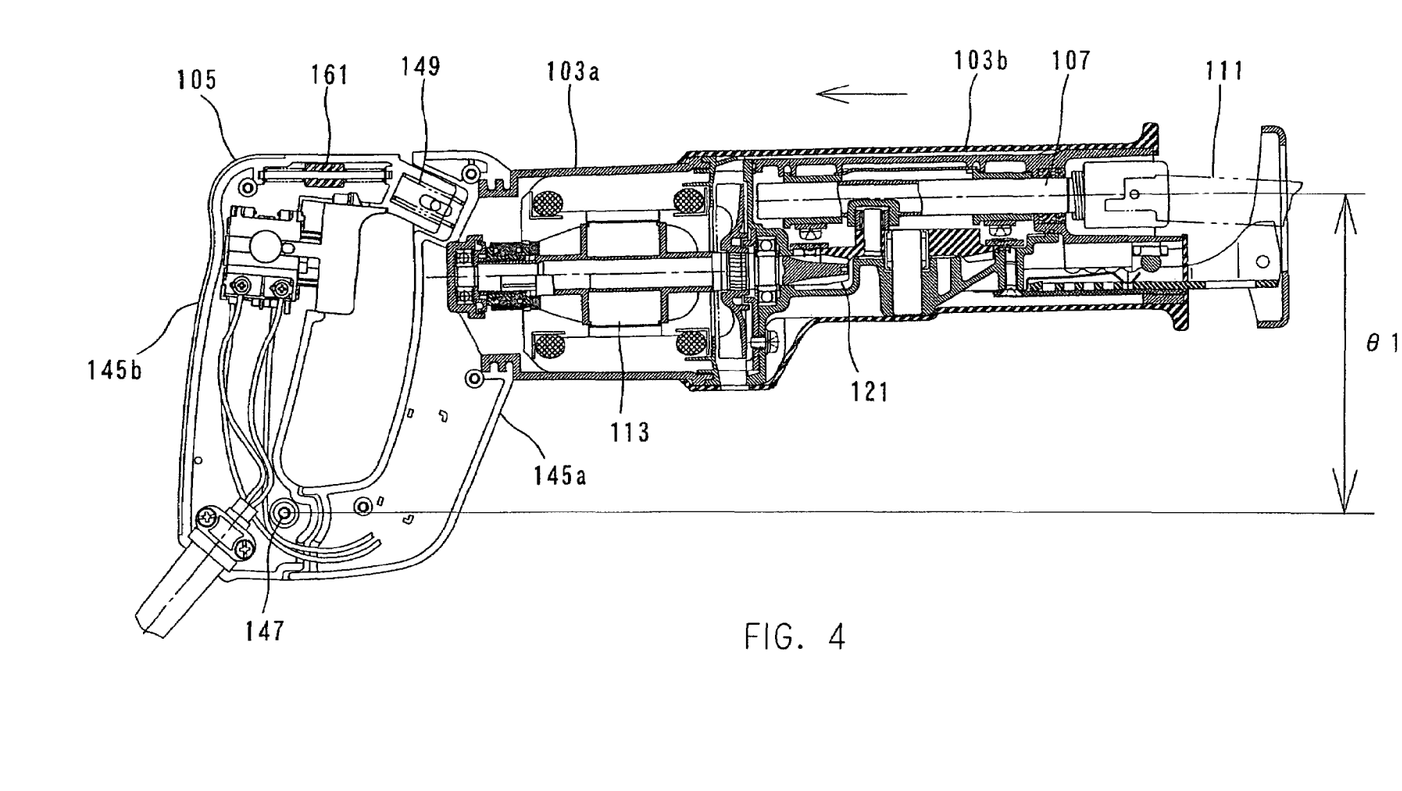
FIG. 4 is a view showing the inclination of a blade when a slider is in the bottom dead center.
Figure 5:
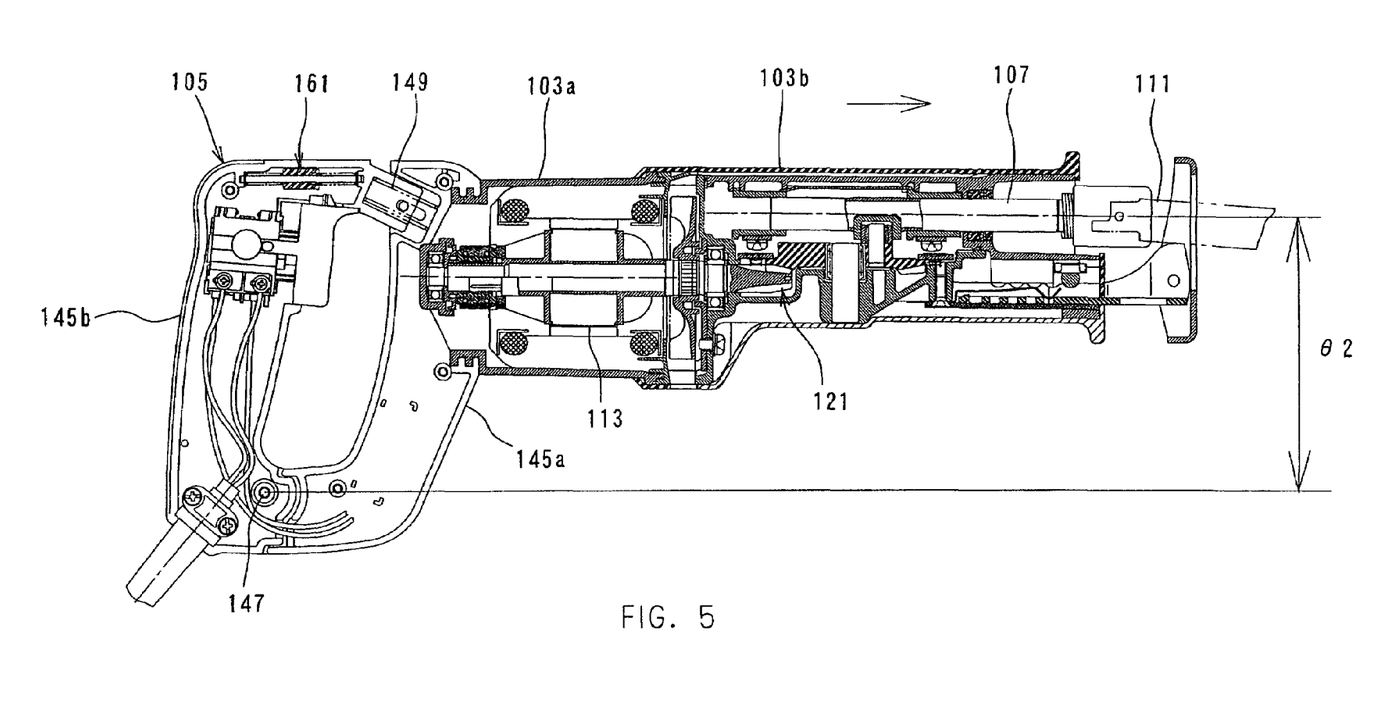
FIG. 5 is a view showing the inclination of the blade when the slider is in the upper dead center.

When the slide 107 moves from the top dead center to the bottom dead center or when the blade 111 retracts to be drawn leftward as viewed in FIG. 1 to cut the workpiece, the angle of inclination of the blade 111 defined by the angle between the horizontal axis and the axis of the slider 107 gradually increases. In other words, the tip end of the blade 111 is oriented upward. By such increase in the blade inclination, the number of teeth of the blade 111 which touch the workpiece during cutting operation is reduced compared with the case in which the blade 111 is moved linearly. Therefore, the teeth of the blade 111 readily dig into the workpiece, so that the cutting efficiency can be improved. On the other hand, when the slider 107 moves from the bottom dead center to the top dead center (the blade 111 is pushed), the angle of inclination of the blade 111 gradually decreases. FIG. 4 shows the blade 111 inclined at an angle of θ1 (for example, 1°) when the slider 107 is in the bottom dead center. FIG. 5 shows the blade 111 inclined at an angle of θ2 (for example, −5°) when the slider 107 is in the top dead center. Thus, according to the embodiment, when the blade 111 linearly reciprocates the blade 111 is caused to vertically swing together with the body 103, so that the angle of inclination of the blade 111 changes. As a result, the cutting efficiency can be improved. The angle of inclination of the blade 111 tends to vary in a greater degree as the load during cutting operation increases.

The reciprocating saw 101 according to the embodiment is configured to achieve vibration reduction of the handgrip 105 and greater cutting efficiency by improving the construction for mounting the handgrip 105. Therefore, in contrast to the known arts in which a functional component is additionally provided in the blade actuating mechanism in order to reduce vibration and/or improve the cutting efficiency, the reciprocating saw 101 can be simpler in construction and lighter in weight. Further, the motor housing 103a and the gear housing 103b which form the body 103 can be made thinner. Therefore, ease of use can be enhanced in performing a cutting operation while holding the moving grip part 145b by one hand and holding the tip end region of the body 103 by the other hand.

Further, because each of the vibration-proof handgrip 105 and the normal handgrip 205 of standard specification can be detachably mounted to the body 103 and can be replaced with the other, the reciprocating saw 101 can be provided in high-efficiency mode and in standard-efficiency mode.

Further, the dynamic vibration reducer 161 is provided within the moving grip part 145b of the handgrip 105. Therefore, the dynamic vibration reducer 161 in the moving grip part 145b performs a vibration reducing function with respect to vibrations of the moving grip part 145b which cannot be absorbed any more by the compression coil spring 149. Specifically, vibration reducing elements in the dynamic vibration reducer 161, i.e. the weight 165 and the biasing springs 167 cooperate to passively reduce vibration of the moving grip part 145b of the reciprocating saw 101 on which a predetermined external force (vibration) is exerted. Thus, the vibration of the reciprocating saw 101 can be effectively alleviated or reduced. Further, when vibrations caused when the blade 111 reciprocates have a low frequency at the source so that the compression coil spring 149 can not appropriately absorb such vibrations, the dynamic vibration reducer 161 can alleviate such vibrations. Thus, provision of the dynamic vibration reducer 161 can further reduce the vibration of the moving grip part 145b, so that the ease of use of the reciprocating saw 101 can be further enhanced. In this case, the dynamic vibration reducer 161 is disposed on the line of reciprocating movement of the blade 111. Therefore, the dynamic vibration reducer 161 can efficiently perform the vibration reducing function, and generation of vibration by actuation of the dynamic vibration reducer 161 can be avoided. Thus, the dynamic vibration reducer 161 can effectively perform the vibration reducing function.

Further, rubber may be used instead of the compression coil spring 149 as an elastic element according to the representative embodiment. Further, according to the embodiment, the reciprocating saw 101 has been described as an example of the reciprocating power tool, but this invention may be applied to tools, such as a jig saw, which performs a cutting operation on a workpiece by reciprocating. Further, in this embodiment, the handgrip 105 has been described as having a D-shape, but it is not limited to this shape.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

DESCRIPTION OF NUMERALS

101 reciprocating saw (reciprocating power tool)
103 body
103a motor housing
103b gear housing
105 handgrip
105a left half
105b right half
106 shoe
107 slider
108 bearing
109 chuck
111 blade (tool bit)
113 driving motor
115 trigger switch
117 motor shaft
119 pinion
121 motion converting mechanism (actuating mechanism)

123 bevel gear
125 fixed shaft
127 bearing
129 crank pin
131 slider block
131a guide groove
133 bearing
141 opening
142 engaging portion
143 grip mounting portion
144 clamping screw
145a fixed part
145b moving grip part
147 pivot
147a bush
147b screw
151 tubular portion
151a projection
153 space
153a guide groove
161 dynamic vibration reducer
163 guide rod
165 weight
167 biasing spring
205 normal handgrip
205a left half
205b right half
244 clamping screw

What we claim is:

1. A reciprocating power tool defined by a reciprocating saw, comprising:
 a body;
 a tool bit disposed in a tip end region of the body, the tool bit being defined by a saw blade;
 a motor disposed within the body, the motor causing the tool bit to linearly reciprocate;
 a handgrip disposed on a rear end of the body on the side opposite to the tool bit, wherein the handgrip and the body are coupled to each other such that the handgrip and the body can rotate with respect to each other via a fixed axis pivot about a rotational axis extending in a direction perpendicular to a direction of reciprocating linear motion of the tool bit and wherein the tool bit swings together with the body with respect to the handgrip held by a user of the power tool, at the same time as when the tool bit linearly reciprocates with respect to the body via the motor; and
 an elastic element disposed between the handgrip and the body and declined forwardly along an axis that is angled such that it declines forwardly with respect to the direction of reciprocating linear motion of the tool bit, the elastic element being received by a rectangular tubular portion having a circular bore, wherein the elastic element absorbs vibration transmitted from the body to the handgrip by elastically receiving the relative rotation of the handgrip and the body,
 wherein, when linearly reciprocating, the tool bit vertically swings on the pivot together with the body by an inertial force acting upon the body such that an angle of inclination of the reciprocating tool bit is changed,
 when the tool bit linearly moves in a direction to cut a workpiece, the angle of inclination of the tool bit gradually increases, and
 the tubular portion projects forward on the decline and is movably inserted into a space of the handgrip.

2. The reciprocating power tool as defined in claim 1, wherein the handgrip is detachably coupled to the body and replaceable with another handgrip.

3. The reciprocating power tool as defined in claim 1, wherein the elastic element is positioned apart from the pivot and arranged such that the biasing direction of the elastic element is tangential to the rotation around the pivot.

4. The reciprocating power tool as defined in claim 1, further comprising a dynamic vibration reducer disposed in the handgrip, the dynamic vibration reducer reducing the vibration transmitted from the body to the handgrip during cutting operation.

5. The reciprocating power tool as defined in claim 4, wherein at least one of the elastic element and the dynamic vibration reducer is disposed substantially on the line of reciprocating movement of the tool bit.

6. The reciprocating power tool as defined in claim 1, wherein the pivot is provided at a lower end of the handgrip, and the elastic element is provided at an upper end of the handgrip.

7. The reciprocating power tool as defined in claim 1, wherein the elastic element is a compression spring, the compression spring being compressed when the handgrip rotates about the pivot.

8. The reciprocating power tool as defined in claim 1, wherein the angle of inclination of the reciprocating tool bit changes while the tool bit vertically swings.

9. The reciprocating power tool as defined by claim 1, wherein the elastic element is disposed generally in the direction of the reciprocating linear motion of the tool bit and tangentially to the rotational axis at the pivot.

10. The reciprocating power tool as defined by claim 1, wherein a biasing force of the elastic element is tangential to the rotational axis at the pivot.

11. The reciprocating power tool as defined by claim 1, wherein the elastic element is disposed forward of the pivot and tangentially to the rotational axis at the pivot.

12. The reciprocating power tool as defined by claim 1, wherein a center of the elastic element is located closer to the blade than the pivot is in the longitudinal direction of the reciprocation of the tool bit.

13. The reciprocating power tool as defined by claim 12, wherein the entire elastic element is located closer to the blade than the pivot is in the longitudinal direction of the reciprocation of the tool bit.

14. A reciprocating power tool defined by a reciprocating saw, comprising:
 a body;
 a tool bit disposed in a tip end region of the body, the tool bit being defined by a saw blade;
 a motor disposed within the body, the motor causing the tool bit to linearly reciprocate;
 a handgrip disposed on a rear end of the body on the side opposite to the tool bit, wherein the handgrip and the body are coupled to each other such that the handgrip and the body can rotate with respect to each other via a fixed axis pivot about a rotational axis extending in a direction perpendicular to a direction of reciprocating linear motion of the tool bit and wherein the tool bit swings together with the body with respect to the handgrip held by a user of the power tool, at the same time as when the tool bit linearly reciprocates with respect to the body via the motor;
 an elastic element disposed between the handgrip and the body and declined forwardly along an axis that is angled such that it declines forwardly with respect to the direction of reciprocating linear motion of the tool bit, wherein the elastic element absorbs vibration transmitted from the body to the handgrip by elastically receiving the relative rotation of the handgrip and the body; and a dynamic vibration reducer disposed in the handgrip and located immediately behind the elastic element, the dynamic vibration reducer reducing the vibration transmitted from the body to the handgrip during cutting operation, wherein, when linearly reciprocating, the tool bit vertically swings on the pivot together with the body by an inertial force acting upon the body such that an angle of inclination of the reciprocating tool bit is changed, and wherein, when the tool bit linearly moves in a direction to cut a workpiece, the angle of inclination of the tool bit gradually increases.

15. The reciprocating power tool as defined in claim 14, wherein the dynamic vibration reducer comprises a single dynamic vibration reducer.

16. The reciprocating power tool as defined in claim 14, wherein the elastic element reduces the tangential force about the pivot while the dynamic vibration reducer reduces the force in the reciprocating direction of the saw blade.

17. The reciprocating power tool as defined in claim 14, wherein the handgrip is detachably coupled to the body and replaceable with another handgrip.

18. The reciprocating power tool as defined in claim 14, wherein the elastic element is positioned apart from the pivot and arranged such that the biasing direction of the elastic element is tangential to the rotation around the pivot.

19. The reciprocating power tool as defined in claim 14, wherein the pivot is provided at a lower end of the handgrip, and the elastic element is provided at an upper end of the handgrip.

20. The reciprocating power tool as defined in claim 14, wherein the elastic element is a compression spring, the compression spring being compressed when the handgrip rotates about the pivot.

21. The reciprocating power tool as defined in claim 14, wherein the angle of inclination of the reciprocating tool bit changes while the tool bit vertically swings.

22. The reciprocating power tool as defined by claim 14, wherein the elastic element is disposed generally in the direction of the reciprocating linear motion of the tool bit and tangentially to the rotational axis at the pivot.

23. The reciprocating power tool as defined by claim 14, wherein a biasing force of the elastic element is tangential to the rotational axis at the pivot.

24. The reciprocating power tool as defined by claim 14, wherein the elastic element is disposed forward of the pivot and tangentially to the rotational axis at the pivot.

25. The reciprocating power tool as defined by claim 14, wherein a center of the elastic element is located closer to the blade than the pivot is in the longitudinal direction of the reciprocation of the tool bit.

26. The reciprocating power tool as defined by claim 25, wherein the entire elastic element is located closer to the blade than the pivot is in the longitudinal direction of the reciprocation of the tool bit.

* * * * *